United States Patent
Fang et al.

(10) Patent No.: US 10,522,101 B2
(45) Date of Patent: Dec. 31, 2019

(54) DISPLAY SUBSTRATE, DISPLAY PANEL AND DISPLAY DEVICE

(71) Applicant: Xiamen Tianma Micro-Electronics Co., Ltd, Xiamen (CN)

(72) Inventors: Liting Fang, Xiamen (CN); Yucheng Chen, Xiamen (CN); Yujiao Liang, Xiamen (CN); Nasen Chen, Xiamen (CN); Qiong Song, Xiamen (CN); Ling Wu, Xiamen (CN); Boping Shen, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 60 days.

(21) Appl. No.: 15/958,819

(22) Filed: Apr. 20, 2018

(65) Prior Publication Data

US 2019/0164510 A1    May 30, 2019

(30) Foreign Application Priority Data

Nov. 30, 2017    (CN) .......................... 2017 1 1240194

(51) Int. Cl.
*G02F 1/1335* (2006.01)
*G09G 3/36* (2006.01)
(Continued)

(52) U.S. Cl.
CPC ......... *G09G 3/3607* (2013.01); *G02F 1/1333* (2013.01); *G02F 1/13306* (2013.01);
(Continued)

(58) Field of Classification Search
CPC ......... G09G 3/3413; G09G 2300/0443; G09G 2300/0452; G09G 3/2074; G09G 3/2003;
(Continued)

(56) References Cited

U.S. PATENT DOCUMENTS 9,377,174 B2 *   6/2016   Watanabe ......... G02F 1/133308
2008/0012794 A1 * 1/2008  Battersby .............. G02F 1/1345
                                                               345/55
(Continued)

FOREIGN PATENT DOCUMENTS

CN    205334901 U    6/2016

*Primary Examiner* — Duc Q Dinh
(74) *Attorney, Agent, or Firm* — Alston & Bird LLP

(57) ABSTRACT

The present disclosure provides a display substrate, display panel and display device, for improving display effect at irregular-shaped edge. The display substrate includes at least one first region. The first region includes a plurality of pixel units, which includes a first pixel unit and a second pixel unit, the first pixel unit is adjacent to the connecting edge. The first pixel unit includes at least three sub-pixels corresponding to different colors arranged along row direction, and at least one sub-pixel included in the first pixel unit is an irregular-shaped sub-pixel. The second pixel unit includes at least three sub-pixels corresponding to different colors arranged along a row direction, and the sub-pixels included in the second pixel unit each are a regular sub-pixel. A shape of the irregular-shaped sub-pixel is different from that of the regular sub-pixel. Along the row direction, adjacent first and second pixel units share at least one sub-pixel.

20 Claims, 11 Drawing Sheets

(51) Int. Cl.
  *G02F 1/133* (2006.01)
  *G02F 1/1333* (2006.01)
(52) U.S. Cl.
  CPC ........ *G09G 3/3611* (2013.01); *G02F 2201/52* (2013.01); *G02F 2201/56* (2013.01)
(58) Field of Classification Search
  CPC ..... G02F 2001/134345; G02F 2201/52; G02F 1/1333; G02F 1/133609; G02F 1/1368; G02F 2201/56; G02F 2201/122; G02F 1/133707; G02F 2001/136222; H01L 27/14607; H01L 27/1463; H01L 27/14636; G06F 3/0448
  See application file for complete search history.

(56) References Cited

U.S. PATENT DOCUMENTS

| | | | |
|---|---|---|---|
| 2010/0289994 A1* | 11/2010 | Nonaka | G02F 1/133514 349/108 |
| 2016/0178940 A1* | 6/2016 | Yuan | G02F 1/133514 359/893 |
| 2016/0343284 A1* | 11/2016 | Sun | H01L 51/0011 |
| 2017/0160603 A1* | 6/2017 | Zhang | G02F 1/133512 |

* cited by examiner

DISPLAY SUBSTRATE, DISPLAY PANEL AND DISPLAY DEVICE

CROSS-REFERENCE TO RELATED APPLICATIONS

The present application claims priority to Chinese Patent Application No. CN201711240194.2, filed on Nov. 30, 2017, the content of which is incorporated herein by reference in its entirety.

TECHNICAL FIELD

The present disclosure relates to the field of display technologies and, in particular to a display substrate, a display panel, and a display device.

BACKGROUND

With the development of science and technology, a simple rectangular display screen can no longer meet the users' requirements. Therefore, irregular-shaped display devices have emerged.

However, irregular-shapes (any display screens that are not rectangular-shaped can be referred as irregular-shaped display screens, abbreviated as irregular-shapes) have poor display effect, especially at edges of the irregular-shapes, for example, a color cast may occur.

SUMMARY

In view of this, embodiments of the present disclosure provide a display substrate, a display panel, and a display device for improving the display effect at the edges of the irregular-shapes.

In a first aspect, the present disclosure provides a display substrate, including at least one first region. The first region includes a first edge and a second edge. The first edge is connected with the second edge through a connecting edge. An extension direction of the first edge is perpendicular to an extension direction of the second edge. An extension direction of the connecting edge is neither parallel to the extension direction of the first edge nor parallel to the extension direction of the second edge. The first region further includes a plurality of pixel units. The plurality of pixel units includes a first pixel unit and a second pixel unit. The first pixel unit is adjacent to the connecting edge. The first pixel unit includes at least three sub-pixels corresponding to different colors arranged along a row direction. At least one of the sub-pixels in the first pixel unit is an irregular-shaped sub-pixel. The second pixel unit includes at least three sub-pixels corresponding to different colors arranged along the row direction, and each of the sub-pixels in the second pixel unit is a regular sub-pixel. A shape of the irregular-shaped sub-pixel is different from a shape of the regular sub-pixel. Along the row direction, the adjacent first pixel unit and second pixel unit share at least one sub-pixel.

In a second aspect, the present disclosure provides a display panel, and the display panel includes a display substrate. The display substrate includes at least one first region. The first region includes a first edge and a second edge. The first edge is connected with the second edge through a connecting edge. An extension direction of the first edge is perpendicular to an extension direction of the second edge. An extension direction of the connecting edge is neither parallel to the extension direction of the first edge nor parallel to the extension direction of the second edge. The first region further includes a plurality of pixel units. The plurality of pixel units includes a first pixel unit and a second pixel unit. The first pixel unit is adjacent to the connecting edge. The first pixel unit includes at least three sub-pixels corresponding to different colors arranged along a row direction. At least one of the sub-pixels in the first pixel unit is an irregular-shaped sub-pixel. The second pixel unit includes at least three sub-pixels corresponding to different colors arranged along the row direction, and each of the sub-pixels in the second pixel unit is a regular sub-pixel. A shape of the irregular-shaped sub-pixel is different from a shape of the regular sub-pixel. Along the row direction, the adjacent first pixel unit and second pixel unit share at least one sub-pixel.

In a third aspect, the present disclosure provides a display device, and the display device includes a display panel. The display panel includes a display substrate. The display substrate includes at least one first region. The first region includes a first edge and a second edge. The first edge is connected with the second edge through a connecting edge. An extension direction of the first edge is perpendicular to an extension direction of the second edge. An extension direction of the connecting edge is neither parallel to the extension direction of the first edge nor parallel to the extension direction of the second edge. The first region further includes a plurality of pixel units. The plurality of pixel units includes a first pixel unit and a second pixel unit. The first pixel unit is adjacent to the connecting edge. The first pixel unit includes at least three sub-pixels corresponding to different colors arranged along a row direction. At least one of the sub-pixels in the first pixel unit is an irregular-shaped sub-pixel. The second pixel unit includes at least three sub-pixels corresponding to different colors arranged along the row direction, and each of the sub-pixels in the second pixel unit is a regular sub-pixel. A shape of the irregular-shaped sub-pixel is different from a shape of the regular sub-pixel. Along the row direction, the adjacent first pixel unit and second pixel unit share at least one sub-pixel.

BRIEF DESCRIPTION OF DRAWINGS

The accompanying drawings are briefly introduced as follows. The drawings are not meant to be limiting; those skilled in the art will be able to see alternative drawings without paying creative effort.

DESCRIPTION OF EMBODIMENTS

Figure 1:
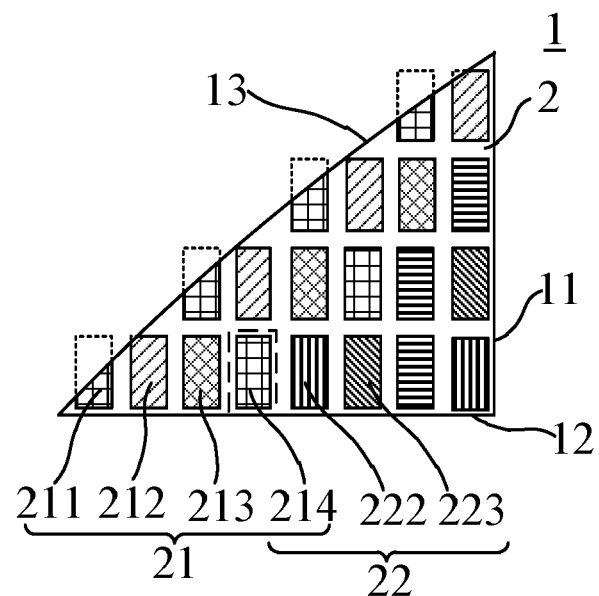
FIG. 1 is a structural schematic diagram of a display substrate according to an embodiment of the present disclosure.

In order to make the purpose, technical solutions, and advantages of the embodiments of the present disclosure to be clearer, the technical solutions in the embodiments of the present disclosure are clearly and completely described in the following with reference to the accompanying drawings in the embodiments of the present disclosure. Obviously, the described embodiments are merely exemplary embodiments of the present disclosure, which shall not be interpreted as limiting the present disclosure. All other embodiments obtained by those skilled in the art without creative efforts according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that, although color sub-pixels may be described using the terms of "first", "second", "third", etc., in the embodiments of the present disclosure, the color sub-pixels will not be limited by these terms. These terms are merely used to distinguish color sub-pixels from one another. For example, without departing from the scope of the embodiments of the present disclosure, a first color sub-pixel may also be referred to as a second color sub-pixel, similarly, a second color sub-pixel may also be referred to as a first color sub-pixel, similarly, a third color sub-pixel may also be referred to as a first color sub-pixel, etc.

Hereinafter, a color sub-pixel refers to a sub-pixel corresponding to a color. In other words, a region on the display substrate corresponding to the sub-pixel can display the color. For example, a red color sub-pixel refers to a sub-pixel corresponds to red, and a region on the display substrate corresponding to the red color sub-pixel can display red.

It should be noted that, the expressions such as "upper", "lower", "left", "right" and the like mentioned in embodiments of the present disclosure are described with reference to the placement status in the accompanying drawings, and should not be construed as limiting embodiments of the present disclosure. In addition, it should also be understood that, in the context, while referring to an element being formed "above" or "below" another element, it is possible that the element is directly formed "above" or "below" the other element, it is also possible that the element is formed "above" or "below" the other element via a middle element.

Before describing the embodiments in detail, an irregular-shaped display panel and an irregular-shaped sub-pixel involved in the embodiments will be briefly introduced.

Usually, the display area of the display panel is designed into a rectangular shape, for example, most cellphones have rectangular shapes. With the rise of wearable devices, in order satisfy the users' personality requirements, shapes of display panels have become increasingly diversified, such as a circular shape, a fan shape, an arc shape, a groove shape or the like. In the embodiments, a display area having a shape that is not rectangular is referred as an irregular-shaped display area, but this does not mean that only an irregular-shaped display area exists in the technical solution involved in the embodiments. In the embodiments, the display area may include an irregular-shaped display area, and may also include a regular display area other than the irregular-shaped display area.

In addition, in the embodiments, a sub-pixel disposed in the regular display area is referred to as a regular sub-pixel, and the regular sub-pixel may have a rectangle shape. Since the irregular-shaped display area necessarily includes an irregular-shaped edge that is not a straight line, a sub-pixel nearby the irregular-shaped edge is limited by the irregular-shaped edge, so that the shape of the sub-pixel cannot be a rectangle. In the embodiments, a sub-pixel that is not rectangular-shaped is referred to as an irregular-shaped sub-pixel. However, it does not mean that the irregular-shaped display area in the embodiments includes only irregular-shaped sub-pixels, and it should be understood that the irregular-shaped display area in the embodiments may include irregular-shaped sub-pixels and may also include regular sub-pixels.

Moreover, an aperture area of a sub-pixel can be understood as an area other than the area occupied by the wiring of the sub-pixel. A ratio of the aperture area of a sub-pixel to the total area occupied by the sub-pixel is referred to as an aperture ratio, which can also be understood as a ratio of the area of the effective light-transmitting region of the sub-pixel to the total area. For example, the aperture area of an irregular-shaped sub-pixel represents the area of the effective light-transmitting region of the irregular-shaped sub-pixel, and the aperture area of a regular sub-pixel represents the area of the effective light-transmitting region of the regular sub-pixel.

The embodiments provide a display substrate, as shown in FIG. 1. FIG. 1 is a structural schematic diagram of a display substrate according to an embodiment of the present disclosure. The display substrate 1 includes at least one first region 2. The first region 2 includes a first edge 11 and a second edge 12, and the first edge 11 and the second edge 12 are connected by a connecting edge 13. The first region 2 can be considered as a region surrounded by the first edge 11, the second edge 12 and the connecting edge 13. An extension direction (column) of the first edge 11 is perpendicular to an extension direction (row) of the second edge 12. An extension direction of the connecting edge 13 is neither parallel to the extension direction of the first edge 11 nor parallel to the extension direction of the second edge 12.

It should be understood that, the first region 2 can be considered as an irregular-shaped display area. In the irregular-shaped display area (the first region), since the extension direction of the first edge 11 is perpendicular to the extension direction of the second edge 12, the first edge 11 and the second edge 12 can be considered as regular edges. Since the extension direction of the connecting edge 13 is neither parallel to the extension direction of the first edge 11 nor parallel to the extension direction of the second edge 12, that is, neither an angle between the connecting edge 13 and the first edge 11 nor an angle between the connecting edge 13 and the second edge 12 is 90°, then the connecting edge 13 can be considered as an irregular-shaped edge.

The first region 2 includes a plurality of pixel units, the plurality of pixel units includes a first pixel unit 21 and a second pixel unit 22, and the first pixel unit 21 is adjacent to the connecting edge 13. The first pixel unit 21 includes at least three sub-pixels corresponding to different colors arranged along a row direction. As shown in FIG. 1, the first pixel unit 21 includes four sub-pixels 211-214. The sub-pixel 211 corresponds to the same color as the sub-pixel 214. Among the sub-pixels in the first pixel unit 21 correspond to three different colors, at least one sub-pixel 211 is an irregular-shaped sub-pixel. The second pixel unit 22 includes sub-pixels corresponding to at least three different colors arranged along a row direction, and the sub-pixels included in the second pixel unit 22 include sub-pixels 214, 222 and 223, all of which are regular sub-pixels. The shape of the irregular-shaped sub-pixel 211 is different from those of the regular sub-pixels.

It should be understood that, taking FIG. 1 as an example, the irregular-shaped sub-pixel 211 close to the connecting edge 13 (irregular-shaped edge) includes only a display portion filled with a pattern (the dashed line portion in the irregular-shaped sub-pixel 211 can be understood as a notch portion, which is not used for display and can be cut off when manufacturing the irregular-shaped sub-pixel, or can be blocked by a black matrix). Therefore, compared with the regular sub-pixel, the irregular-shaped sub-pixel 211 has a different shape. It can also be understood that the aperture area of this irregular-shaped sub-pixel (the display portion, the region filled with a pattern in the irregular-shaped sub-pixel 211) is smaller than the aperture area of the regular sub-pixel. In addition, with further reference to FIG. 1, in the first pixel unit 21, the sub-pixel adjacent to the irregular-shaped edge 13 is the irregular-shaped sub-pixel 211, and the remaining two sub-pixels 212 and 213 may also be considered as regular sub-pixels.

As an example, although patterns for filling the three sub-pixel in the first pixel unit are not the same as patterns for filling of the three sub-pixels in the second pixel unit in FIG. 1, however, it does not mean that the colors corresponding to the three sub-pixels in the first pixel unit are different from the colors corresponding to the three sub-pixels in the second pixel unit. The filling of the patterns is only for distinguishing the first pixel unit from the second pixel unit.

With further reference to FIG. 1, along the row direction, the adjacent first pixel unit 21 and second pixel unit 22 share at least one sub-pixel 214, and the sub-pixel 214 may be referred to as a shared sub-pixel. During the display process of the irregular-shaped pixel unit (the first pixel unit 21), the color of the shared sub-pixel 214 is the same as the color of the irregular-shaped sub-pixel 211, so as to make up the notch portion of the irregular-shaped sub-pixel 211. By adjusting the display ratio of the shared sub-pixel 214 and the irregular-shaped sub-pixel 211, the irregular-shaped sub-pixel 211 and the shared sub-pixel 214 in the first pixel unit 21 can achieve display of a regular sub-pixel.

Figure 2:
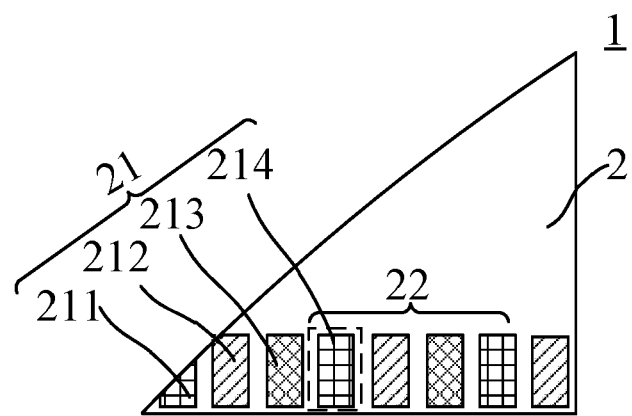
FIG. 2 is another structural schematic diagram of a display substrate according to an embodiment of the present disclosure.

In the following, the structure shown in FIG. 2 will be taken as an example to briefly describe the sharing principle. FIG. 2 is another structural schematic diagram of a display substrate according to an embodiment of the present disclosure. As shown in FIG. 2, the first pixel unit 21 includes four sub-pixels 211-214, and the second pixel unit 22 adjacent to the first pixel unit 21 includes four sub-pixels. The sub-pixel 214 is a shared sub-pixel between the first pixel unit 21 and the second pixel unit 22. For example, from left to right in the first pixel unit 21, the color corresponding to the irregular-shaped sub-pixel 211 is red, the color of the sub-pixel 212 is green, the color of the sub-pixel 213 is blue, and the color of the shared sub-pixel 214 is also red. The colors corresponding to the four sub-pixels in the adjacent second pixel unit 22 correspond to the colors corresponding to the sub-pixels in the first pixel unit 21. It is assumed that the first pixel unit 21 needs to display white light. In this case, one red sub-pixel, one green sub-pixel, and one blue sub-pixel are required. During the display process, the display ratio of the irregular-shaped sub-pixel 211 (red sub-pixel) and the shared sub-pixel 214 (red sub-pixel) in the first pixel unit 21 is controlled so as to realize display of a regular sub-pixel, so that the chromaticity of the white light displayed by the first pixel unit 21 is the same as the chromaticity displayed by the regular pixel unit (e.g., the second pixel unit 22). It should be understood that the shared sub-pixel 214 makes up the deficiency of the small aperture area of the irregular-shaped sub-pixel 211 (the red irregular-shaped sub-pixel), so that the light emitted by the first pixel unit 21 including the irregular-shaped sub-pixel 211 will not generate a color cast.

Further, in order to make those skilled in the art better understand the solution, the sharing will be briefly described in the following.

Figure 3:
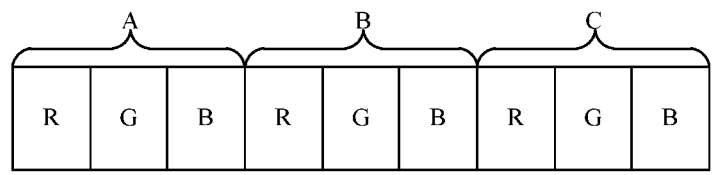
FIG. 3 is a diagram illustrating a pixel display method in the related art.

FIG. 3 is a diagram illustrating a pixel display method in the related art. As shown in FIG. 3, each sub-pixel is arranged according to RGB, and three sub-pixels corresponding to RGB are formed as one display unit. It is assumed that three display units are required to display white light, i.e., display units A, B, and C. In this display process, nine sub-pixels are used in total.

Figure 4:
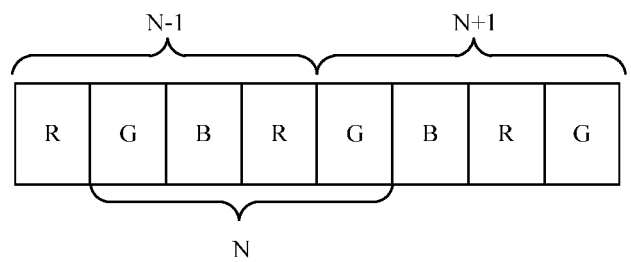
FIG. 4 is another structural schematic diagram of a display substrate according to an embodiment of the present disclosure.

FIG. 4 is another structural schematic diagram of a display substrate according to an embodiment of the present disclosure. As shown in FIG. 4, each sub-pixel is arranged according to the order of RGB. Every four sub-pixels form one display unit. For example, the display unit N−1 includes four sub-pixels corresponding to RGBR, the display unit N includes four sub-pixels corresponding to GBRG, and the display unit N+1 includes four sub-pixels corresponding to GBRG. The display unit N−1 and the adjacent display unit N share three sub-pixels o corresponding to GBR. It is assumed that three display units are required to display white light, i.e., display units N−1, N, and N+1. In this display process, eight sub-pixels are used in total. With this sharing manner, the number of sub-pixels can be reduced while achieving the same display effect as that achieved by the structure shown in FIG. 3, so that within a valid area, such as a display panel having a specific size, each sub-pixel can occupy a relatively large area and the sub-pixel density can decreased. Furthermore, the area occupied by each sub-pixel is relatively large, and the manufacturing difficulty of the sub-pixel cab be decreased, thereby saving manufacturing costs.

In the related art, the irregular-shaped edge cannot be provided with a regular sub-pixel. Generally, the sub-pixel disposed at the irregular-shaped edge is usually cut, and the sub-pixel after being cut can be referred to as an irregular-shaped sub-pixel. Although the irregular-shaped sub-pixel can be disposed at the irregular-shaped edge, the aperture area of the irregular-shaped sub-pixel is smaller than the aperture area of the adjacent uncut sub-pixel (regular sub-pixel), and thus emits less light of a certain color, which causes that the display at the irregular-shaped edge tends to the color of the regular sub-pixel. In addition, the irregular-shaped sub-pixel has a smaller aperture area, so that the light amount emitted from the sub-pixel can be decreased, and thus the brightness at the irregular-shaped edge can be darker.

The connecting edge included in the first display area is neither parallel to the extension direction of the first edge nor parallel to the extension direction of the second edge, that is, the angle between the connecting edge and the first edge or the second edge is not 90° or approximately 90°. In this case, the connecting edge can be referred to as an irregular-shaped edge. Since there is at least one first pixel unit adjacent to a connecting edge (an irregular-shaped edge), the at least one first pixel unit is inevitably limited by the irregular-shaped edge (the connecting edge), so that the sub-pixel of the first pixel unit close to the connecting edge has a different shape from the rectangular regular sub-pixel. In the embodiments, this sub-pixel having a different shape from a rectangular regular sub-pixel is referred to as an irregular-shaped sub-pixel. Under the constraint by the irregular-shaped edge, at least one of all sub-pixels in the first pixel unit is an irregular-shaped sub-pixel. The irregular-shaped sub-pixel has a different shape from the rectangular regular sub-pixel, so the aperture area of the irregular-shaped sub-pixel is not equal to the aperture area of the rectangular regular sub-pixel, resulting in a color cast problem for the first pixel unit during the display process.

In the embodiments, the adjacent first pixel unit 21 and second pixel unit 22 share at least one sub-pixel, so as to make up for the deficiency that the aperture area of the irregular-shaped sub-pixel is not equal to the aperture area of the rectangular regular sub-pixel, and thus in the display process, the irregular-shaped sub-pixel of the first pixel unit 21 can display normally, or the display effect of the first pixel unit 21 is the same as the display effect of a regular pixel unit (a pixel unit formed by regular sub-pixels), thereby alleviating the color cast problem at the irregular-shaped edge. In addition, in the display process, the display brightness presented by the first pixel unit 21 approximates the display brightness presented by the regular pixel unit, which significantly improves the display brightness at the irregular-shaped edge.

In addition, it should be noted that, the display of a different second pixel unit formed by regular sub-pixels may also be implemented in a sharing manner, which will not be limited in the embodiments.

With further reference to FIG. 1, in the row direction, a first pixel unit 21 is disposed between the second pixel unit 22 and the connecting edge 13. The first pixel unit 21 includes an irregular-shaped sub-pixel 211. The first pixel unit 21 will not generate a color cast in the display process. For detailed display principles and beneficial effects, please refer to the related description above.

Figure 5:
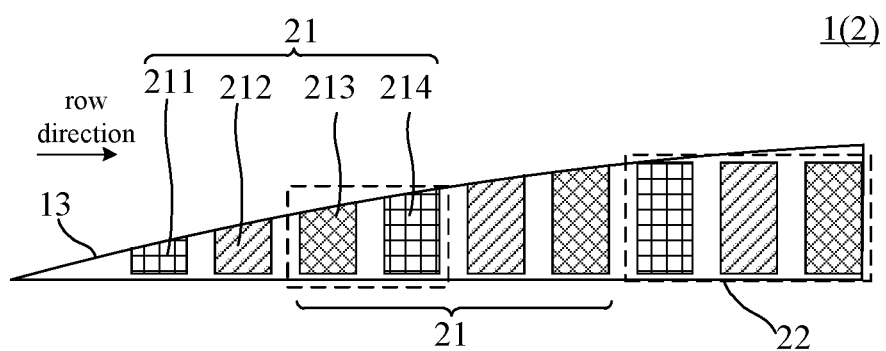
FIG. 5 is another structural schematic diagram of a display substrate according to an embodiment of the present disclosure.

In an embodiment, as shown in FIG. 5, which is another structural schematic diagram of a display substrate according to an embodiment of the present disclosure, along the row direction, at least two first pixel units 21 are provided between the second pixel unit 22 and the connecting edge 13, each of the first pixel units 21 includes four sub-pixels 211-214, and all the four sub-pixels are irregular-shaped sub-pixels. Adjacent two first pixel units of the at least two first pixel units 21 share at least one sub-pixel. With further reference to FIG. 5, the display principle of the first pixel unit is briefly described by taking adjacent two first pixel units 21 sharing two sub-pixels 213 and 214 as an example. For example, taking the first pixel unit 21 on the left side in FIG. 5 as an example, it is assumed that the sub-pixel 211 is a red sub-pixel, the sub-pixel 212 is a green sub-pixel, the sub-pixel 213 is a blue sub-pixel, and the sub-pixel 214 is a red sub-pixel. When displaying white light, one red sub-pixel, one green sub-pixel and one blue sub-pixel are required. In this case, the display ratio of the shared sub-pixel 214 (red sub-pixel) is controlled to make up for the sub-pixel 211 (red sub-pixel), so that the chromaticity of the red sub-pixel can be increased. Then, the display ratio of the sub-pixel 213 and the sub-pixel 212 can be further adjusted, so that the three sub-pixels 211-213 can display white light. Thus, while achieving the brightness as much as possible, the color cast problem at the irregular-shaped edge (the connecting edge) can be alleviated and the display effect can be improved.

Figure 6:
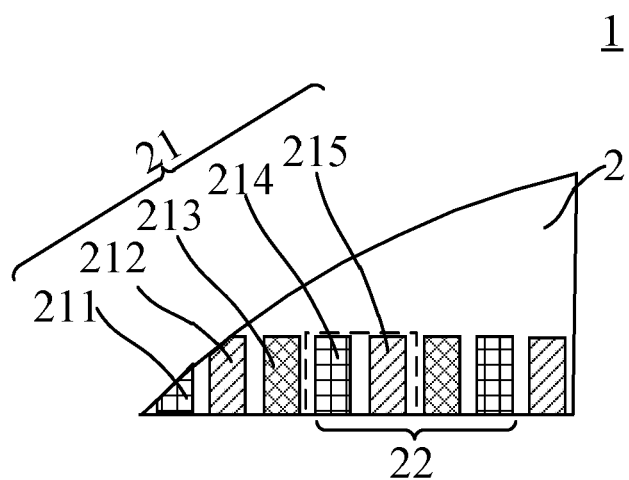
FIG. 6 is another structural schematic diagram of a display substrate according to an embodiment of the present disclosure.

With further reference to FIG. 6, which is another structural schematic diagram of a display substrate according to an embodiment of the present disclosure, the adjacent first pixel unit 21 and second pixel unit 22 share two sub-pixels 214-215. The first pixel unit 21 includes five sub-pixels 211-215, and the sub-pixel 211 and the sub-pixel 212 are irregular-shaped sub-pixels. In the embodiment, the second pixel unit 22 may include four sub-pixels as shown in FIG. 6 or may include three sub-pixels, and this embodiment does not limit the number of sub-pixels included in the second pixel unit 22, as long as there are sub-pixels corresponding to at least three different colors. For the embodiment, the displayed color of the shared sub-pixel 215 is the same as the color corresponding to the irregular-shaped sub-pixel 212. Therefore, controlling the display brightness of the shared sub-pixel 215 makes up for the area loss from the irregular-shaped sub-pixel 212, so that combining irregular-shaped sub-pixel 212 and the shared sub-pixel 215 in the first pixel unit 21 achieves the same display effect as a regular sub-pixel corresponding to the same color. The display principle of the irregular-shaped sub-pixel 211 can be understood with reference to the irregular-shaped sub-pixel 212, and will not be further described herein.

Figure 7:
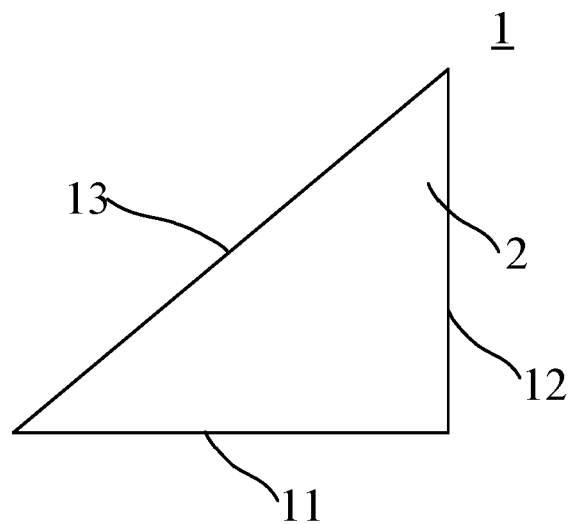
FIG. 7 is another structural schematic diagram of a display substrate according to an embodiment of the present disclosure.

In an embodiment, as shown in FIG. 7, which is another structural schematic diagram of a display substrate according to an embodiment of the present disclosure, the shape of the connecting edge 13 may be a straight line. That is, the cross-sectional view of the irregular-shaped display area is a triangle. Optionally, the shape of the connecting edge 13 may be an arc, referring to FIG. 1 and FIG. 2.

It should be noted that, as examples, FIG. 1, FIG. 2, FIG. 5, and FIG. 6 exemplarily show a number of first pixel units and second pixel units. In fact, the display substrate in the embodiments includes more first pixel units and second pixel units than those being shown, and the number of the first pixel units and the second pixel units will not be limited by the embodiments. In addition, as an example, with the orientation shown in FIG. 5 as a reference, the first edge may be horizontally or vertically disposed, as long as the first edge is perpendicular to or approximately perpendicular to the second edge. Positions of the first edge and the second edge will not be limited by the embodiments.

Figure 8:
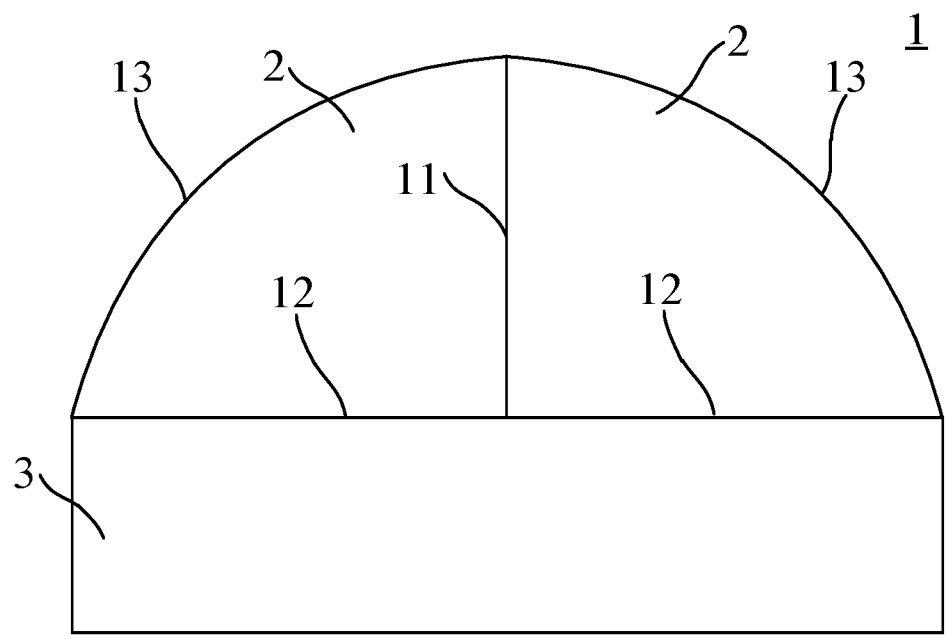
FIG. 8 is another structural schematic diagram of a display substrate according to an embodiment of the present disclosure.

In an embodiment, as shown in FIG. 8, which is another structural schematic diagram of a display substrate according to an embodiment of the present disclosure, the display substrate 1 further includes a second region 3. Two first regions 2 are disposed on a same side of the second region 3, and the first edges 11 of the two first regions 2 coincide with each other. Two straight lines where the second edges 12 of the two first regions 2 are located both coincide with the straight line where one edge of the second region 3 is located. In the embodiment, the two first regions 2 can be formed as a semicircular region, in other words, two connecting edges of the two first regions 2 have arc shapes. In addition, as an example, the shape of the second region shown in FIG. 8 is a rectangle, but it is not limited by the embodiment. It should be noted that, in the embodiment, with the orientation shown in FIG. 8 as a reference, after the first edges 11 of the left and right first regions 2 coincide with each other, the two first regions 2 can be taken as an integral display area, and thus, along the row direction, the first pixel unit and the adjacent second pixel unit can share at least one sub-pixel.

Figure 9:
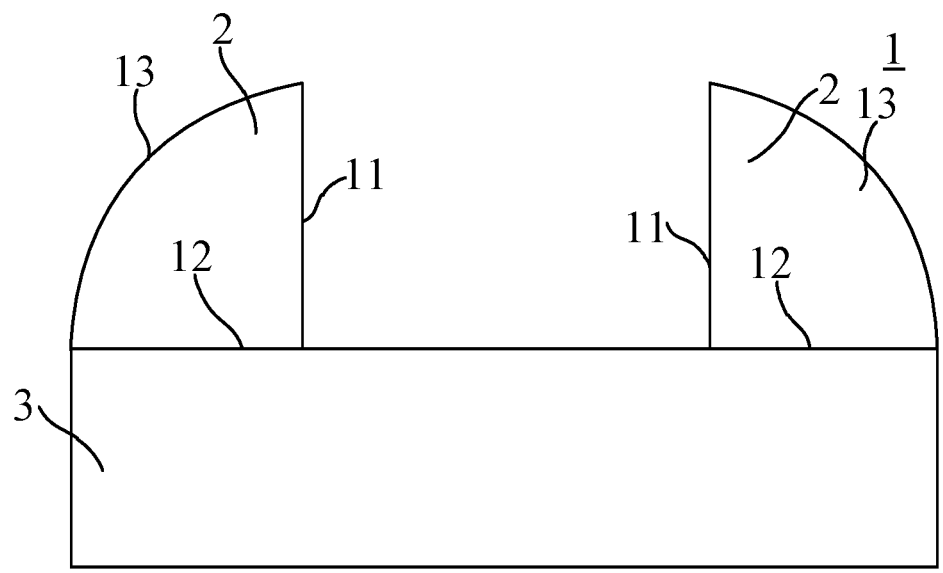
FIG. 9 is another structural schematic diagram of a display substrate according to an embodiment of the present disclosure.
Figure 10:
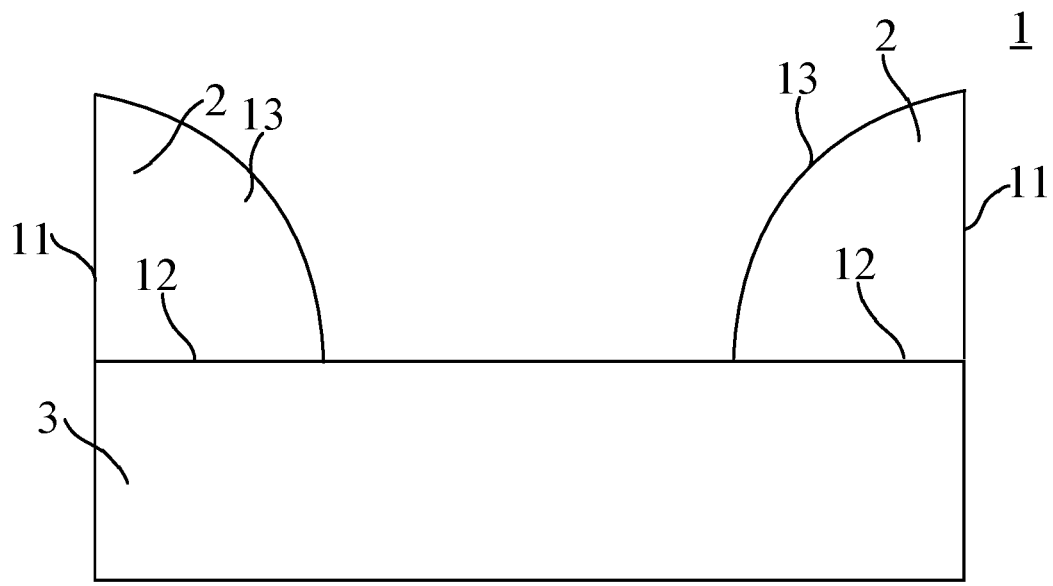
FIG. 10 is another structural schematic diagram of a display substrate according to an embodiment of the present disclosure.

In another embodiment, as shown in FIG. 9 and FIG. 10, each of which is another structural schematic diagram of a display substrate according to an embodiment of the present disclosure, the display substrate 1 further includes a second region 3, and two first regions 2 are disposed on a same side of the second region 3. The first edges 11 of the two first regions 2 are separated from one another, and two straight lines where the second edges 12 of the two first regions 2 are located both coincide with the straight line where one edge of the second region 3 is located. In the embodiment, the first edges of the two first regions 2 are oppositely separated from one another, as shown in FIG. 9, and can be understood as a relative separation, the two first edges are oppositely disposed, and the connecting edge 13 can be considered as a vertex edge of the display substrate 1. Alternatively, as shown in FIG. 10, the two first edges are separated from one another, and the two connecting edges are disposed between the two first edges. With the orientation shown in FIG. 10 as a reference, the two connecting edges 13 are oppositely disposed, the first edge 11 of the left first region 2 is disposed at the leftmost, and the first edge 11 of the right first region 2 is disposed at the rightmost. That is, one straight line where the first edge 11 of the left first region 2 coincides with the straight line where the left edge of the second region 3 is located, and one straight line where the first edge 11 of the right first region 2 coincides with the straight line where the right edge of the second region 3 is located.

In an embodiment, as shown in FIGS. 8-10, the shape of the second region 3 may be a rectangle. It should be noted that, all sub-pixels disposed in the second region 3 are regular sub-pixels. For example, the regular sub-pixels disposed in the second region 3 may be disposed in an array. Therefore, during the display process, when the pixel units (for example, including sub-pixels corresponding to three different colors) are used as display units to achieve the display, the adjacent pixel units may share at least one sub-pixel to achieve the display, which will not be limited by the embodiments.

Figure 11:
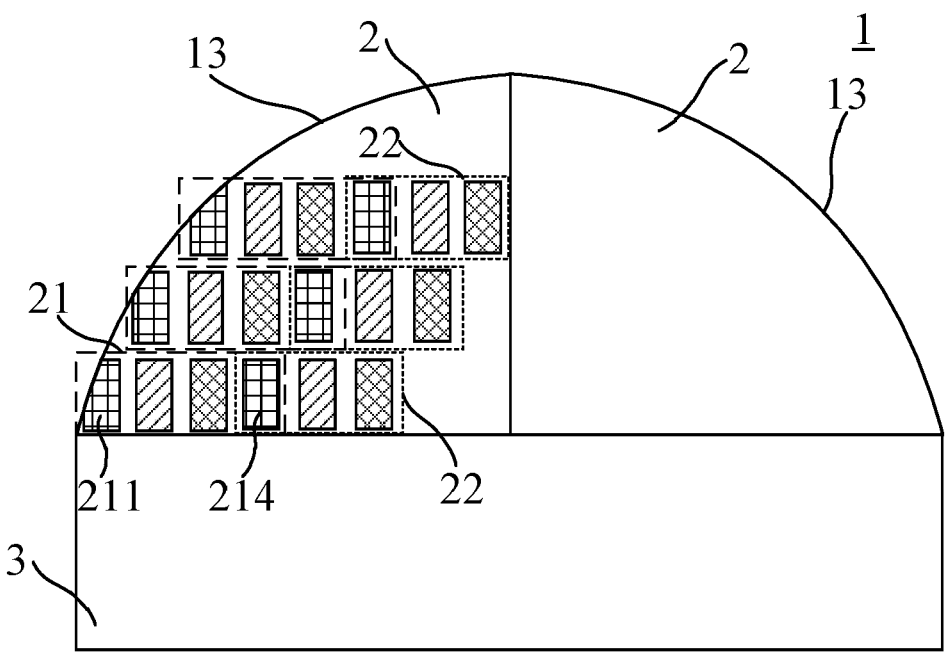
FIG. 11 is another structural schematic diagram of a display substrate according to an embodiment of the present disclosure.

In another embodiment, as shown in FIG. 11, which is another structural schematic diagram of a display substrate according to an embodiment of the present disclosure, the first pixel unit 21 includes an irregular-shaped sub-pixel 211, and the irregular-shaped sub-pixel 211 is adjacent to the connecting edge 13. That is, the first pixel unit 21 is disposed along the connecting edge 13.

In combination with the embodiment shown in FIG. 1, the irregular-shaped sub-pixel 211 included in the first pixel unit 21 is disposed along the irregular-shaped edge (the connecting edge 13), and its corresponding area is not equal to the area of a regular sub-pixel. However, during the display process, since the first pixel unit 21 including the irregular-shaped sub-pixel 211 and the adjacent second pixel unit 22 share at least one sub-pixel 214, the display of the first pixel unit 21 will not be influenced. For detailed reasons, please refer to the above description.

Further, with reference to FIG. 11, in the embodiment, the area of the irregular-shaped sub-pixel 211 is not equal to the area of a regular sub-pixel. It should be understood that, an aperture area of an irregular-shaped sub-pixel may be smaller than an aperture area of a regular sub-pixel, or may be larger than the aperture area of the regular sub-pixel. Regardless of whether the aperture area of the irregular-shaped sub-pixel is larger than or smaller than the aperture area of the regular sub-pixel, the first pixel unit including the irregular-shaped sub-pixel can achieve the same display effect as the adjacent second pixel unit by sharing a sub-pixel with the second pixel unit.

Figure 12:
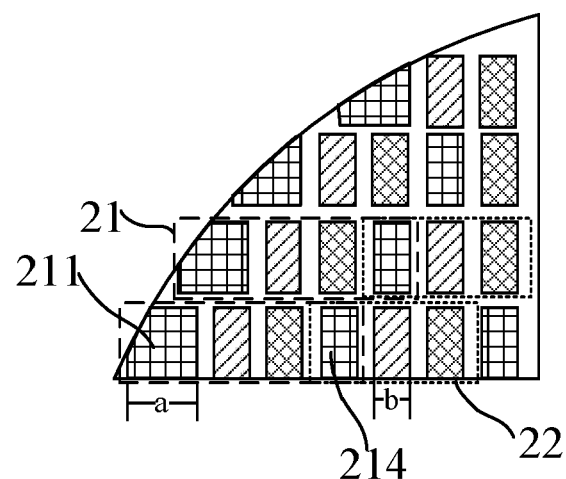
FIG. 12 is another structural schematic diagram of a display substrate according to an embodiment of the present disclosure.

In an embodiment, as shown in FIG. 12, which is another structural schematic diagram of a display substrate according to an embodiment of the present disclosure, along the row direction, the maximum distance between any two points of the irregular-shaped sub-pixel 211 is a, and the maximum distance between any two points of the regular sub-pixel is b, wherein a≥b. It should be understood that, along the row direction, a is the maximum width of the irregular-shaped sub-pixel 211, and b is the width of the regular sub-pixel.

In combination with the embodiment shown in FIG. 1, the irregular-shaped sub-pixel 211 included in the first pixel unit 21 is disposed along the irregular-shaped edge (the connecting edge 13), and its corresponding area is not equal to the area of the regular sub-pixel. However, during the display process, since the first pixel unit 21 including the irregular-shaped sub-pixel 211 and the adjacent second pixel unit 22 share at least one sub-pixel 214, the display of the first pixel unit 21 will not be influenced. For detailed reasons, please refer to the above description. Moreover, the example further has the following effects.

Along the row direction, for a display substrate having a specific size, the greater the number of the arranged sub-pixels is, the higher the display resolution is. That is, the larger the area occupied by the sub-pixels is, the lower the resolution is. In the embodiment, along the row direction, the width a of the irregular-shaped sub-pixel 211 is larger than the width b of the regular sub-pixel, and it can be understood that the resolution of the first pixel unit is smaller than that of the second pixel unit. In combination with the above embodiments, it can be known that the first pixel unit including the irregular-shaped sub-pixel and the adjacent second pixel unit share at least one sub-pixel, so that the display effect of the first pixel unit during the display process is the same as that of the second pixel unit (a regular pixel unit formed by regular sub-pixels). Therefore, in the embodiment, although the resolution of the irregular-shaped sub-pixel 211 is smaller, the final display effect thereof is the same as the display effect of the regular pixel unit, i.e., it can facilitate displaying with a low resolution to achieve displaying with a high-resolution.

Further, the width a of the irregular-shaped sub-pixel 211 is equal to the total width of the two regular sub-pixels, that is, a=2b.

Figure 13:
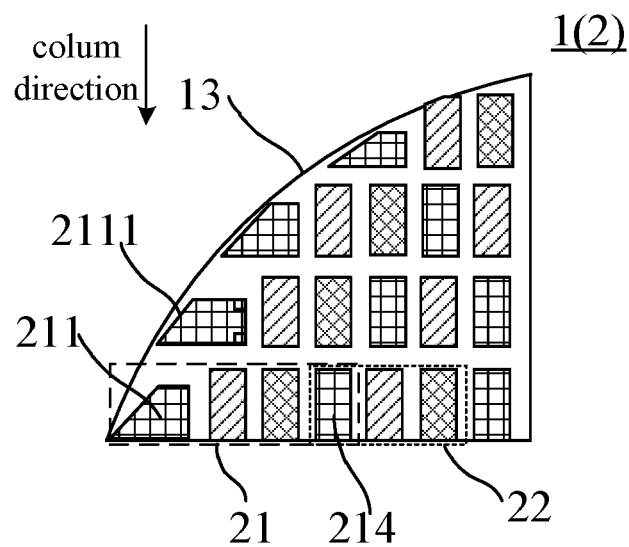
FIG. 13 is another structural schematic diagram of a display substrate according to an embodiment of the present disclosure.
Figure 14:
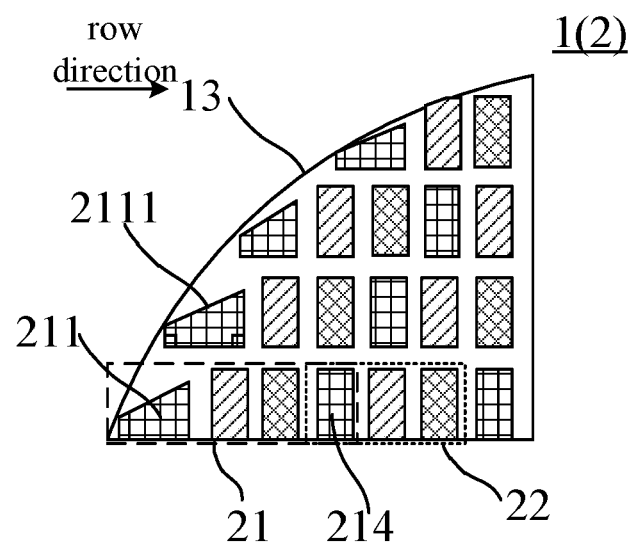
FIG. 14 is another structural schematic diagram of a display substrate according to an embodiment of the present disclosure.

In the embodiments, there are various shapes for an irregular-shaped sub-pixel. In an embodiment, as shown in FIG. 13, which is another structural schematic diagram of a display substrate according to an embodiment of the present disclosure, the shape of the irregular-shaped sub-pixel 211 is a right-angled trapezoid. The right-angled waist of the right-angled trapezoid is parallel to the column direction, and the oblique waist 2111 of the right-angled trapezoid is close to the connecting edge 13. Alternatively, as shown in FIG. 14, which is another structural schematic diagram of a display substrate according to an embodiment of the present disclosure, the right-angled waist of the right-angle trapezoid is parallel to the row direction, and the oblique waist 2111 of the right-angle trapezoid is close to the connecting edge 13.

In combination with the embodiment shown in FIG. 1, the irregular-shaped sub-pixel 211 included in the first pixel unit 21 is disposed along the irregular-shaped edge (the connecting edge 13), and its corresponding area is not equal to the area of the regular sub-pixel. However, during the display process, since the first pixel unit 21 including the irregular-shaped sub-pixel 211 and the adjacent second pixel unit 22 share at least one sub-pixel 214, the display of the first pixel unit 21 will not be influenced. For detailed reasons, please refer to the above description.

Figure 15:
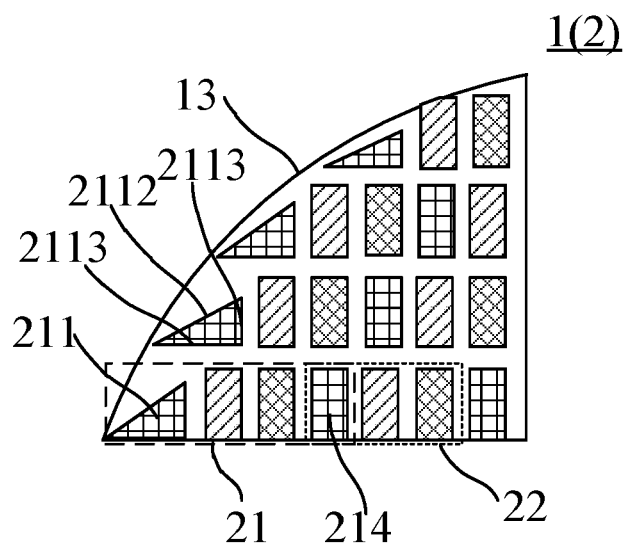
FIG. 15 is another structural schematic diagram of a display substrate according to an embodiment of the present disclosure.

In another embodiment, as shown in FIG. 15, which is another structural schematic diagram of a display substrate according to an embodiment of the present disclosure, the shape of the irregular-shaped sub-pixel 211 is a right-angled triangle and includes two right-angled edges 2113 and one hypotenuse 2112, and the hypotenuse 2112 is close to the connecting edge 13. In combination with the embodiment shown in FIG. 1, the irregular-shaped sub-pixel 211 included in the first pixel unit 21 is disposed along the irregular-shaped edge (the connecting edge 13), and its corresponding area is not equal to the area of the regular sub-pixel. However, during the display process, since the first pixel unit 21 including the irregular-shaped sub-pixel 211 and the adjacent second pixel unit 22 share at least one sub-pixel 214, the display of the first pixel unit 21 will not be influenced. For detailed reasons, please refer to the above description.

Figure 16:
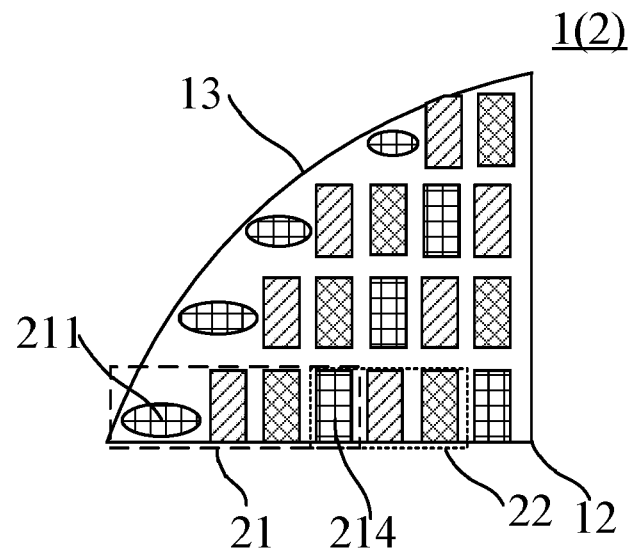
FIG. 16 is another structural schematic diagram of a display substrate according to an embodiment of the present disclosure.

In another embodiment, as shown in FIG. 16, which is another structural schematic diagram of a display substrate according to an embodiment of the present disclosure, the shape of the irregular-shaped sub-pixel 211 is an ellipse, and the long axis of the ellipse is parallel to the extension direction of the second edge 12. Exemplarily, with the orientation shown in FIG. 16 as a reference, the long axis of the irregular-shaped sub-pixel 211 of the ellipse may be disposed horizontally. Alternatively, the second edge may be disposed along the vertical direction, so that the long axis of the irregular-shaped sub-pixel 211 can be vertically disposed. In combination with the embodiment shown in FIG. 1, the irregular-shaped sub-pixel 211 included in the first pixel unit 21 is disposed along the irregular-shaped edge (the connecting edge 13), and its corresponding area is not equal to the area of the regular sub-pixel. However, during the display process, since the first pixel unit 21 including the irregular-shaped sub-pixel 211 and the adjacent second pixel unit 22 share at least one sub-pixel 214, the display of the first pixel unit 21 will not be influenced. For detailed reasons, please refer to the above description.

It should be noted that, as an example, FIGS. 11-16 exemplarily illustrate the shape of the irregular-shaped sub-pixel 211, however, the shape of the irregular-shaped sub-pixel 211 is not be limited to the embodiments, and it can include a shape different from the above embodiments. The shape and size of the irregular-shaped sub-pixel are based on the specific product.

In an embodiment, the sub-pixels corresponding to at least three different colors include at least a first color sub-pixel, a second color sub-pixel and a third color sub-pixel, that is, the first pixel unit includes at least a first color sub-pixel, a second color sub-pixel and a third color sub-pixel. The second pixel unit includes at least a first color sub-pixel, a second color sub-pixel and a third color sub-pixel.

Further, the first color sub-pixel, the second color sub-pixel, and the third color sub-pixel are respectively a red sub-pixel, a green sub-pixel, and a blue sub-pixel. For example, with further reference to FIG. 1, in the first pixel unit 21, the irregular-shaped sub-pixel 211 may be a red sub-pixel, the sub-pixel 212 may be a green sub-pixel, and the sub-pixel 213 may be a blue sub-pixel. Similarly, in the second pixel unit 22, the sub-pixel 214 may be a red sub-pixel, the sub-pixel 222 may be a green sub-pixel, and the sub-pixel 223 may be a blue sub-pixel.

Figure 17:
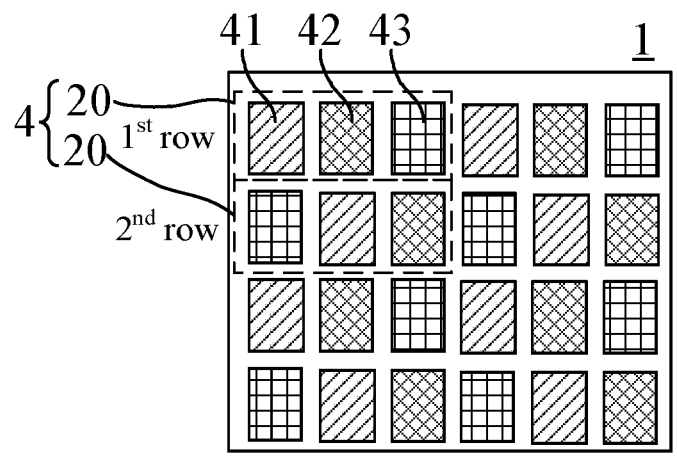
FIG. 17 is another structural schematic diagram of a display substrate according to an embodiment of the present disclosure.

In an embodiment, as shown in FIG. 17, which is another structural schematic diagram of a display substrate according to an embodiment of the present disclosure, the display substrate 1 includes a plurality of repeating units 4 arranged in an array, and the repeating units 4 are arranged in multiple columns along the row direction and arranged in multiple rows along the column direction.

The repeating unit 4 includes two pixel units 20 adjacent in the column direction, that is, two pixel units 20 are arranged in different rows. For example, as shown in FIG. 17, in the two pixel units included in the repeating unit 4, one is disposed in the first row and the other one is disposed in the second row. In the two adjacent pixel units in the column direction, one pixel unit 20 includes a first color sub-pixel 41, a second color sub-pixel 42 and a third color sub-pixel 43 sequentially arranged in the described order in the row direction, and the other one pixel unit 20 includes a third color sub-pixel 43, a first color sub-pixel 41 and a second color sub-pixel 42 sequentially arranged in the described order in the row direction.

It should be noted that, the first color sub-pixel, the second color sub-pixel, and the third color sub-pixel each may be a different one of red, green, and blue, and the pixel unit 20 in this embodiment may be the first pixel unit 21. That is, the repeating unit 4 is disposed along the connecting edge. The sub-pixels corresponding to three colors are arranged at intervals so that the display of the entire display substrate is relatively uniform and the display effect is better. Taking the first color sub-pixel 41 as an example, it is located at the first position in the first row and located at the second position in the second row, so as to achieve the arrangement at intervals in such a method that the sub-pixels corresponding to this color can be evenly distributed on the entire display substrate.

Figure 18:
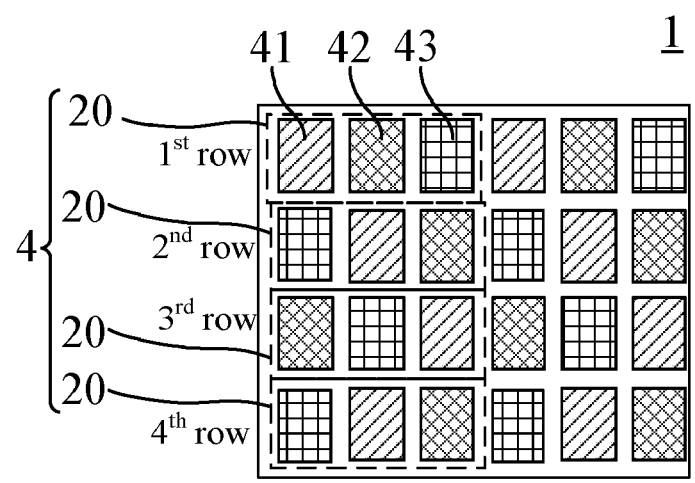
FIG. 18 is another structural schematic diagram of a display substrate according to an embodiment of the present disclosure.

In another embodiment, as shown in FIG. 18, which is another structural schematic diagram of a display substrate according to an embodiment of the present disclosure, the display substrate 1 includes a plurality of repeating units 4, and the repeating units 4 are arranged in multiple columns along the row direction and arranged in multiple rows along the column direction.

The repeating unit 4 includes four pixel units 20 adjacent in the column direction, and the four pixel units 20 included in the repeating unit 4 are distributed in the first to fourth rows. Among the four pixel units adjacent in the column direction, the first pixel unit 20 includes a first color sub-pixel 41, a second color sub-pixel 42 and a third color sub-pixel 43 sequentially arranged in the described order in the row direction; the second pixel unit 20 includes a third color sub-pixel 43, a first color sub-pixel 41 and a second color sub-pixel 42 sequentially arranged in the described order in the row direction; the third pixel unit 20 includes a second color sub-pixel 42, a third color sub-pixel 43 and a first color sub-pixel 41 sequentially arranged in the described order in the row direction; and the fourth pixel unit 20 includes a third color sub-pixel 43, a first color sub-pixel 41 and a second color sub-pixel 42 sequentially arranged in the described order in the row direction.

It should be noted that, the first color sub-pixel, the second color sub-pixel, and the third color sub-pixel each may be a different one of red, green and blue, and the pixel unit 20 in this embodiment may be the first pixel unit 21. That is, the repeating unit 4 is disposed along the connecting edge. For example, at least one of the pixel units 20 is the first pixel unit 21. The sub-pixels corresponding to three colors are arranged at intervals so that the display of the entire display substrate is relatively uniform and the display effect is better. Taking the first color sub-pixel 41 as an example, in the first row pixel unit, the first color sub-pixel 41 is located at the position of the first sub-pixel; in the second row pixel unit, the first color sub-pixel 41 is located at the position of the second sub-pixel; in the third row pixel unit, the first color sub-pixel 41 is located at the position of the third sub-pixel; and in the fourth row pixel unit, the first color sub-pixel 41 is located at the position of the second sub-pixel, so as to achieve the arrangement at intervals in such a method that this color can be evenly displayed during the display process.

Figure 19:
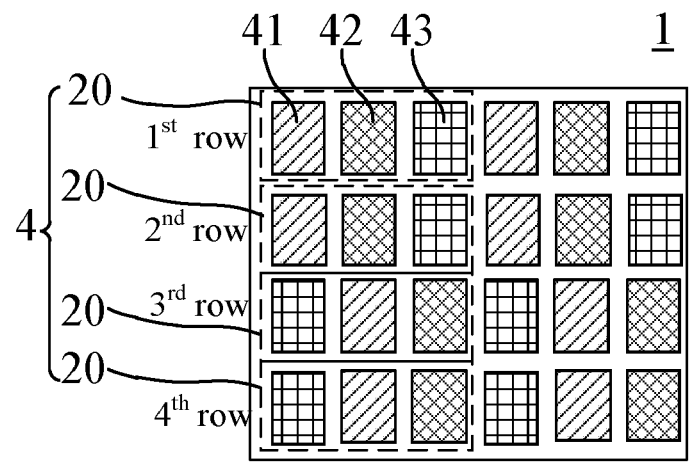
FIG. 19 is another structural schematic diagram of a display substrate according to an embodiment of the present disclosure.

In another embodiment, as shown in FIG. 19, which is another structural schematic diagram of a display substrate according to an embodiment of the present disclosure, the display substrate 1 includes a plurality of repeating units 4, and the repeating units 4 are arranged in multiple columns along the row direction and arranged in multiple rows along the column direction.

The repeating unit 4 includes four pixel units 20 adjacent in the column direction. Exemplary, the four pixel units 20 included in the repeating unit 4 are distributed in the first row to the fourth row. Among the four pixel units 20 adjacent in the column direction, the first pixel unit 20 and the second pixel unit 20 each includes a first color sub-pixel 41, a second color sub-pixel 42 and a third color sub-pixel 43 sequentially arranged in the described order in the row direction; and the third pixel unit 20 and the fourth pixel unit 20 each includes a third color sub-pixel 43, a first color sub-pixel 41 and a second color sub-pixel 42 sequentially arranged in the described order in the row direction.

It should be noted that, the first color sub-pixel, the second color sub-pixel, and the third color sub-pixel each may be a different one of red, green and blue, and the pixel unit 20 in this embodiment may be the first pixel unit 21. That is, the repeating unit 4 is disposed along the connecting edge. The sub-pixels corresponding to three colors are arranged at intervals in such a method that the display of the entire display substrate is relatively uniform and the display effect is better. For details, please refer to the above description.

Figure 20:
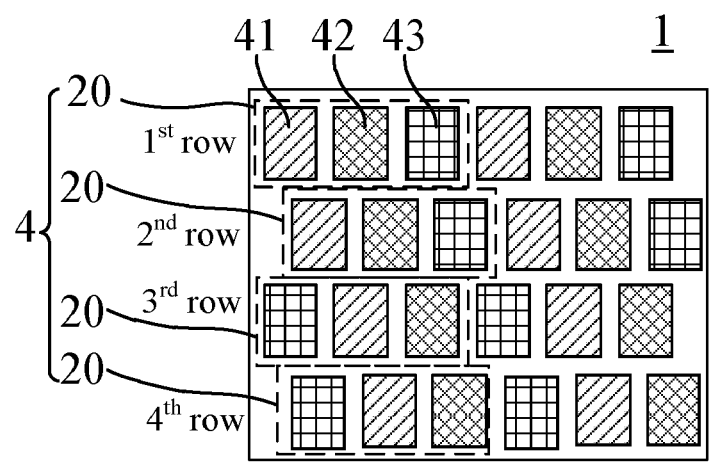
FIG. 20 is another structural schematic diagram of a display substrate according to an embodiment of the present disclosure.

In another embodiment, as shown in FIG. 20, which is another structural schematic diagram of a display substrate according to an embodiment of the present disclosure, the display substrate 1 includes a plurality of repeating units 4, and the repeating units 4 are arranged in multiple columns along the row direction and arranged in multiple rows along the column direction.

The repeating unit 4 includes four pixel units 20 adjacent in the column direction. For example, the four pixel units 20 included in the repeating unit 4 are distributed in the first row to the fourth row. Among the four pixel units 20 adjacent in the column direction, the arrangement of sub-pixels of the pixel unit 20 in the third row is the same as the arrangement of sub-pixels of the pixel unit 20 in the first row, and the arrangement of sub-pixels of the pixel unit 20 in the fourth row is the same as the arrangement of sub-pixels of the pixel unit 20 in the second row.

Further, with reference to FIG. 20, in the two pixel units 20 adjacent in the column direction, the sub-pixels in one pixel unit 20 deviate to one side in the row direction with respect to the sub-pixels in the other pixel unit 20. The dislocation arrangement method allows any sub-pixel to be evenly disposed on the display substrate, thereby achieving the better display effect. This embodiment does not specifically limit the arrangement of each sub-pixel in each row pixel unit, and the technical solutions in FIGS. 17-19 can be combined with the technical solutions in this embodiment. In other words, the pixel arrangements in FIGS. 17-19 can also adopt the dislocation arrangement. In addition, with the orientation shown in FIG. 20 as a reference, the pixel unit disposed in the second row may deviate to the left side or may deviate to the right side, which will not be limited in this embodiment.

In a preferred embodiment, the distance of the deviating is less than or equal to ½ of a length of the regular sub-pixel in the row direction. If the distance of the dislocation is too large, a larger step is likely to occur at the edge position, affecting the display effect. If the distance of the dislocation is too small, the dislocation cannot be achieved, thereby also affecting the display effect.

Figure 21:
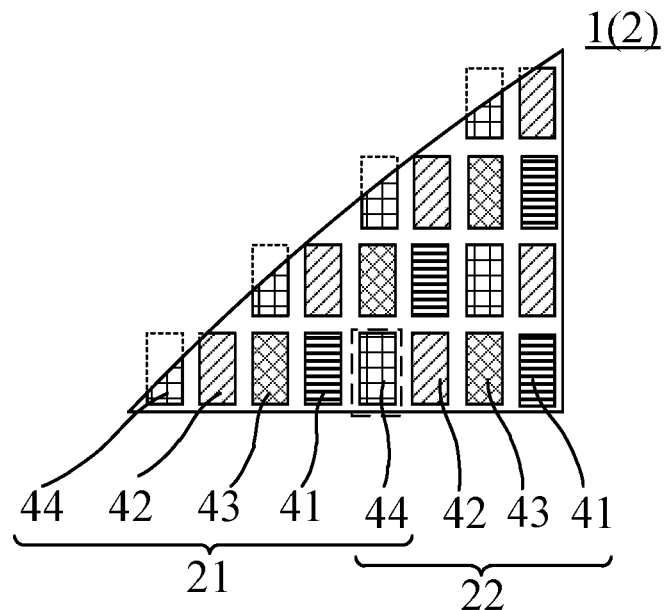
FIG. 21 is another structural schematic diagram of a display substrate according to an embodiment of the present disclosure.

In another embodiment, as shown in FIG. 21, which is another structural schematic diagram of a display substrate according to an embodiment of the present disclosure, the first pixel unit 21 and the second pixel unit 22 each includes sub-pixels corresponding to at least four different colors, and the sub-pixels corresponding to four different colors are a first color sub-pixel 41, a second color sub-pixel 42, a third color sub-pixel 43 and a highlighted sub-pixel 44, respectively. Herein, a highlighted sub-pixel is a sub-pixel having a higher brightness than a sub-pixel corresponding to red, a sub-pixel corresponding to green and a sub-pixel corresponding to blue. For example, the highlighted sub-pixel may be a sub-pixel corresponding to while or a sub-pixel corresponding to yellow. In at least one row, the irregular-shaped sub-pixel 211 is the highlighted sub-pixel 44. The highlighted sub-pixel 44 can increase the display brightness of the first pixel unit 21 and the second pixel unit 21, and increase the display brightness of the irregular-shaped display area, especially the display brightness at the position of the irregular-shaped edge (the connecting edge).

Further, the highlighted sub-pixel may be a white sub-pixel.

Figure 22:
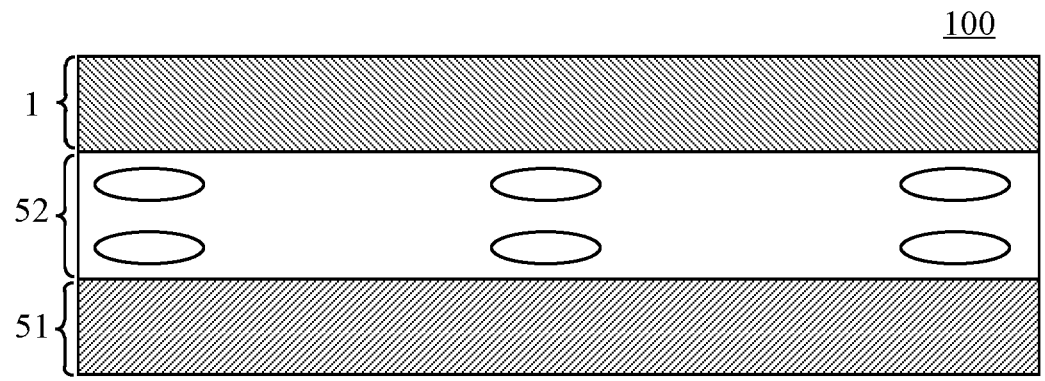
FIG. 22 is a structural schematic diagram of a display panel according to an embodiment of the present disclosure.

The embodiments provide a display panel 100. The display panel includes the display substrate 1 involved in the above embodiments. For example, the display panel 100 may be a liquid crystal display panel. FIG. 22 is a structural schematic diagram of a display panel according to an embodiment of the present disclosure. When the display panel 100 is a liquid crystal display panel, the display substrate 1 may be a color film substrate, the liquid crystal display panel further includes an array substrate 51 disposed opposite to the color film substrate, and a liquid crystal layer 52 disposed between the color film substrate and the array substrate 51.

Figure 23:
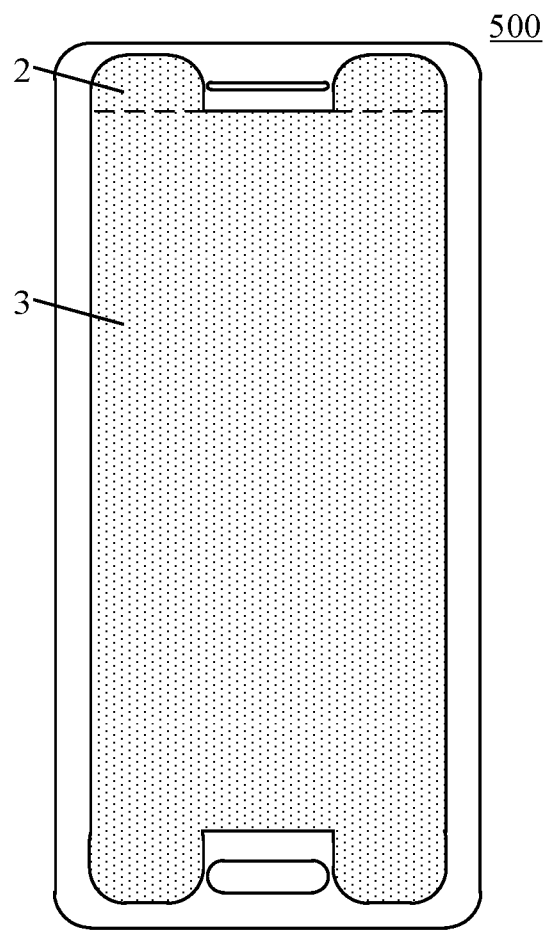
FIG. 23 is a diagram illustrating a display device according to an embodiment of the present disclosure.

The embodiments provide a display device, as shown in FIG. 23, which is a diagram illustrating a display device according to an embodiment of the present disclosure, the display device 500 includes the above-described display panel 100. As shown in FIG. 23, four vertex angles of a mobile phone may be first regions 2, i.e., irregular-shaped display areas, and a rectangular region in the middle may be referred to as a second region 3. It should be noted that, FIG. 23 shows a cellphone as an example of a display device. In fact, the display device involved in the embodiments of the present disclosure can include, but not limited to, a personal computer (PC), a personal digital assistant (PDA), a wireless handheld device, a tablet computer, a cellphone, a MP3 player, a MP4 player, etc.

Finally, it should be noted that, the above-described embodiments are merely for illustrating the present disclosure but not intended to provide any limitation. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A display substrate, comprising:
   at least one first region,
   wherein the first region comprises a first edge and a second edge, wherein the first edge is connected with the second edge through a connecting edge; wherein an extension direction of the first edge is perpendicular to an extension direction of the second edge, and an extension direction of the connecting edge is neither parallel to the extension direction of the first edge nor parallel to the extension direction of the second edge;
   wherein the first region further comprises a plurality of pixel units, wherein the plurality of pixel units comprises a first pixel unit and a second pixel unit, and wherein the first pixel unit is adjacent to the connecting edge; wherein the first pixel unit comprises at least three sub-pixels corresponding to different colors arranged along a row direction, and wherein at least one of the sub-pixels in the first pixel unit is an irregular-shaped sub-pixel; wherein the second pixel unit comprises at least three sub-pixels corresponding to different colors arranged along the row direction, and each of the sub-pixels in the second pixel unit is a regular sub-pixel; wherein a shape of the irregular-shaped sub-pixel is different from a shape of the regular sub-pixel;
   wherein along the row direction, at least two first pixel units are disposed between the second pixel unit and the connecting edge;
   wherein two adjacent first pixel units of the at least two first pixel units share two sub-pixels; and
   wherein adjacent first pixel unit and second pixel unit share the two sub-pixels.

2. The display substrate according to claim 1, wherein a shape of the connecting edge is an arc or a straight line.

3. The display substrate according to claim 1, wherein the display substrate further comprises a second region, two first regions of the at least one first region are disposed on a same side of the second region, and first edges of the two first regions coincide with each other, and two straight lines where the second edges of the two first regions are located both coincide with a straight line where one edge of the second region is located.

4. The display substrate according to claim 1, further comprising a second region, wherein two of the first regions are disposed spaced apart on one side of the second region, wherein the second edges of the two first regions and the side of the second region share a same line.

5. The display substrate according to claim 1, wherein said at least one irregular-shaped sub-pixel in the first pixel unit is adjacent to the connecting edge.

6. The display substrate according to claim 5, wherein along the row direction, there is one first pixel unit disposed between the second pixel unit and the connecting edge.

7. The display substrate according to claim 1, wherein along the row direction, a maximum distance between any two points of the irregular-shaped sub-pixel is a, and a maximum distance between any two points of the regular sub-pixel is b, wherein a≥b.

8. The display substrate according to claim 7, wherein a=2b.

9. The display substrate according to claim 5, wherein an aperture area of the irregular-shaped sub-pixel is unequal to an aperture area of the regular sub-pixel.

10. The display substrate according to claim 1, wherein a shape of the irregular-shaped sub-pixel is a right-angled trapezoid;
    wherein a right-angled waist of the right-angled trapezoid is in column direction, and an oblique waist of the right-angled trapezoid is close to the connecting edge; or
    wherein a right-angled waist of the right-angled trapezoid is in row direction, and the oblique waist of the right-angled trapezoid is close to the connecting edge.

11. The display substrate according to claim 1, wherein a shape of the irregular-shaped sub-pixel is a right-angled triangle comprising two right-angled edges and one hypotenuse, and the hypotenuse is close to the connecting edge.

12. The display substrate according to claim 1, wherein a shape of the irregular-shaped sub-pixel is an ellipse, and a long axis of the ellipse is parallel to the extension direction of the second edge.

13. The display substrate according to claim 1, wherein the at least three sub-pixels corresponding to different colors comprise at least a first color sub-pixel, a second color sub-pixel and a third color sub-pixel.

14. The display substrate according to claim 13, wherein the first, the second and the third color sub-pixels are respectively red, green, and blue sub-pixels.

15. The display substrate of claim 1, further comprising a plurality of repeating units arranged in an array of columns and rows;
   wherein the plurality of repeating units each comprises two adjacent pixel units in the column direction; wherein one of the two said pixel units comprises a first color sub-pixel, a second color sub-pixel and a third color sub-pixel sequentially arranged along the row direction, and the other one of the two pixel units comprises the third color sub-pixel, the first color sub-pixel and the second color sub-pixel sequentially arranged along the row direction.

16. The display substrate of claim 1, further comprising a plurality of repeating units arranged in an array of columns rows;
   wherein the plurality of repeating units each comprises four pixel units adjacent in the column direction; wherein among said four pixel units, a first pixel unit comprises a first color sub-pixel, a second color sub-pixel and a third color sub-pixel sequentially arranged in the row direction, a second pixel unit comprises the third color sub-pixel, the first color sub-pixel and the second color sub-pixel sequentially arranged in the row direction, a third pixel unit comprises the second color sub-pixel, the third color sub-pixel and the first color sub-pixel arranged in the row direction, and a fourth pixel unit comprises the third color sub-pixel, the first color sub-pixel and the second color sub-pixel sequentially arranged in the row direction.

17. The display substrate of claim 1, wherein
   a plurality of repeating units arranged in an array of columns and rows;
   wherein four pixel units adjacent in the column direction form one of the plurality of repeating units; among the four pixel units adjacent in the column direction, a first pixel unit and a second pixel unit each comprises a first color sub-pixel, a second color sub-pixel and a third color sub-pixel sequentially arranged in the row direction, and a third pixel unit and a fourth pixel unit each comprises the third color sub-pixel, the first color sub-pixel and the second color sub-pixel sequentially arranged in the row direction.

18. The display substrate of claim 1, wherein
   comprising a plurality of repeating units arranged in an array of columns and rows;
   wherein four pixel units adjacent in the column direction form one of the plurality of repeating units; among the four pixel units adjacent in the column direction, an arrangement of sub-pixels of one pixel unit in a third row is the same as an arrangement of sub-pixels of one pixel unit in a first row, and an arrangement of sub-pixels of one pixel unit in a fourth row is the same as an arrangement of sub-pixels of one pixel unit in a second row;
   wherein in two pixel units adjacent in the column direction, sub-pixels of one pixel unit deviate to one side in the row direction with respect to sub-pixels of the other pixel unit.

19. The display substrate according to claim 18, wherein a distance of the deviating is less than or equal to ½ of a length of the regular sub-pixel in the row direction.

20. The display substrate according to claim 1, wherein
   the first pixel unit and the second pixel unit each further comprise sub-pixels corresponding to at least four different colors, and the sub-pixels corresponding to four different colors are a first color sub-pixel, a second color sub-pixel, a third color sub-pixel and a highlighted sub-pixel.

* * * * *